United States Patent [19]
Curto et al.

[11] Patent Number: 4,995,713
[45] Date of Patent: Feb. 26, 1991

[54] SPECTACLE FRAME

[75] Inventors: Caterino Curto; Gianantonio Longo, both of Segusino, Italy

[73] Assignee: F.A.O.M.S., Italy

[21] Appl. No.: 353,631

[22] PCT Filed: Apr. 9, 1987

[86] PCT No.: PCT/IT87/00032
§ 371 Date: Apr. 11, 1989
§ 102(e) Date: Apr. 11, 1989

[87] PCT Pub. No.: WO88/02870
PCT Pub. Date: Apr. 21, 1988

[30] Foreign Application Priority Data
Oct. 20, 1986 [IT] Italy ............... 82585 A/86

[51] Int. Cl.[5] .......................... G02C 5/16; G02C 5/14; G02C 5/22
[52] U.S. Cl. .................................... 351/113; 351/121; 351/153
[58] Field of Search ................ 351/113, 121, 153; 16/228

[56] References Cited

U.S. PATENT DOCUMENTS

| 3,531,190 | 9/1970 | Leblanc | 351/113 |
| 3,600,068 | 8/1971 | Jolicoieur et al. | 351/113 |
| 3,923,384 | 12/1975 | Leblanc | 351/113 |

FOREIGN PATENT DOCUMENTS

| 8507262 | 6/1985 | Fed. Rep. of Germany . |
| 317689 | 9/1929 | United Kingdom . |

Primary Examiner—Rodney B. Bovernick
Attorney, Agent, or Firm—Workman, Nydegger & Jensen

[57] ABSTRACT

Spectacle frame comprising a lens retaining portion (A) with lateral extensions (A') allowing flexible articulation of the side arms (C), characterized in that said extensions (A') are hollow and open in the direction of the side arms (C), each side arm (C) being provided with a connection part (B) having an internal transverse slot (3). Each side arm is provided with an S-shaped spring (1) that forms hooks (1', 1") at each end, the first end (1') being insertable into slot (3) of connection part (B), while the other end (1") is insertable into hollow extension (A'), which is so formed as to allow articulation of arms (C).

4 Claims, 1 Drawing Sheet

U.S. Patent
Feb. 26, 1991
Sheet 1 of 1
4,995,713
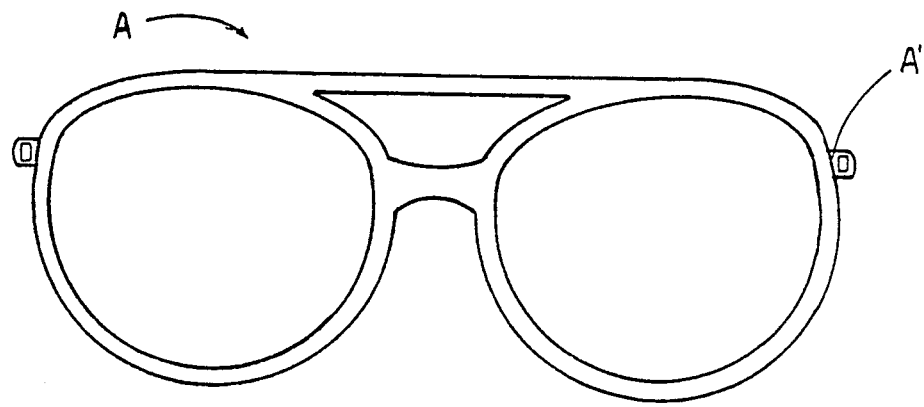
Fig.1
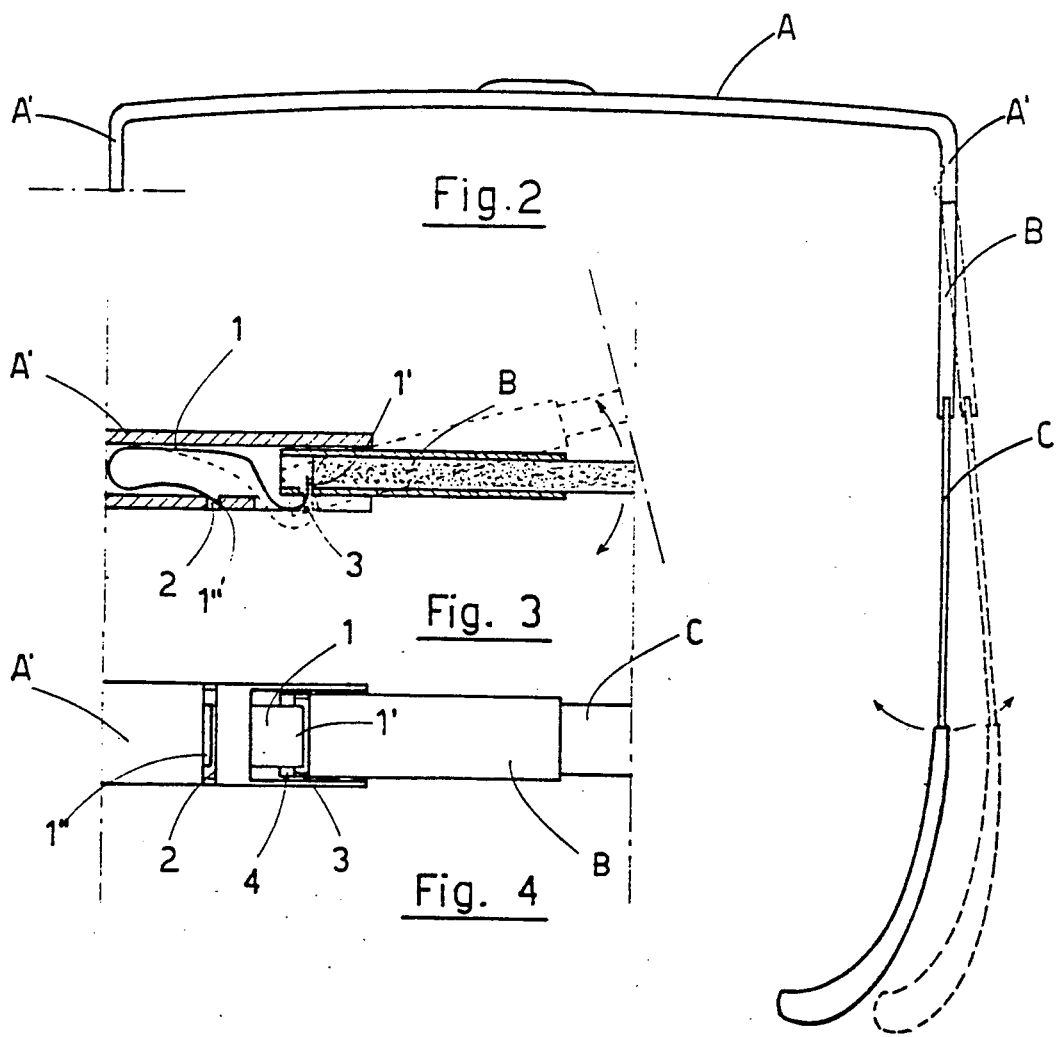

SPECTACLE FRAME

The following invention relates to spectacle frames. The innovation finds particular and convenient application in spectacle frames allowing elastic yielding of the arms during the use of the spectacles and when the arms are folded.

In the present state of the art there is a plurality of devices that allow the elastic yielding of the arm. These are divided substantially into three types:

devices for elastic yielding which are incorporated into the hinges of the arm of the spectacle frame, arms provided with traditional hinges and separate devices for elastic yielding, and finally, arms provided likewise with known hinges and using simple elastic parts interposed between the elements that constitute the rod of the arm, particularly the one found in the plastic rod, (see the Italian patent Application No. 83501 A/83 in the name of the same applicant, filed on 15.11.1983, entitled "Flexible spectacle arm whose length can be regulated with incorporated hinge and relative frame and spectacles"). This solution substantially incorporates in the arm the hinge whose hinging pin is connected by elastic traction spring means to the end of the arm.

The disadvantages according to the above solutions consist in that nearly all the devices of elastic yielding, particularly those provided with a separate hinge group, involve the use of different elements, which are often complex and of difficult form and besides of noteable cost. Furthermore, breakage even only of one element necessitates the substitution of the whole arm. Another disadvantage is that when the spectacles are not used and the arms are not folded, they project outward which may lead to a damage of the spectacles. U.S. Pat. No. 3,531,190 makes use of a sole and unique flexible member connected between the end of each arm and a corresponding lateral extension of the front frame for ensuring both normal pivoting of the arm between its folded position and its normal open position, as well as extra pivoting of the arm beyond the normal open position. In this reference, the flexible member is a strip of spring metal, not an S-shaped spring forming a hook at each end. One end of the flexible member is pivotably attached to the arm end by means of a pivot, not inserted in a transverse slot, while the other end of the flexible member is permanently attached to the lateral extension of the front frame, not removably insertable into an open cavity of such an extension. This arrangement prevents easy substitution of the flexible member by a replacement. GB-A-317689 proposes to use a connection spring to enable the side arms to be bent beyond the normal position. However, separate pivots are used for closing the frame.

The aim of the following invention is to obviate the above-mentioned disadvantages.

The following invention remedies these problems.

The advantages obtained by this solution consist essentially in the simplification and reduction of the number of elements, in increasing the proficiency of the elasticity characteristics, and in facilitating the putting on of the spectacles and the closure of the arms. Finally the solution enables an easy substitution of the elastic spring or of the arm, respectively.

One preferable embodiment is shown in the drawings whose details are not to be seen as limiting but only illustrative.

FIG. 1 represents a schematic front view of a spectacle frame;

FIG. 2 represents a plan view of the spectacle frame as shown in FIG. 1 representing the yielding-hinging system of the arm;

FIG. 3 represents an enlarged plan sectional view of the arm's hinge;

FIG. 4 represents a lateral view.

The above-mentioned figures disclose a spectacle frame A provided with lateral extentions A' and an arm C. The arm C comprises a metallic end connecting part B in a parallelepiped form which is provided on the inside with a transversal slot 3. The slot 3 in the arm B is formed in proximity to the respective end edge that terminates orthogonally. On the inner side of the extention A', whose form is also parallelepiped, a similar slot seat 2 is provided. An S-shaped spring 1 is formed in such a way that its hook end 1' can be inserted in the slot 3 of the arm C, while the other hook end 1" is engaged in the extension A', with this extremity 1" abutting in said seat slot 2. The S-shaped spring is encased in the extension A' nearly in contact with the lateral walls and being shaped to a "U", allowing the end 1" to engage into the slot 2. The inner part at the lateral extension A' is removed to allow the connection part B of the respective arm C to rotate inside.

A light pressure on the arm C towards the outside results in the flexion and stretching of the spring 1, whereas the arm can be freely rotated because the hook end 1' of the spring (1) is inserted in the end groove 3.

Naturally, other details of the embodiment may vary without changing the scope of protection as claimed in the characteristing parts of the following claims.

We claim:

1. A spectacle frame comprising a lens retaining portion (A) with lateral extensions (A') allowing flexible articulation of the side arms (C), characterised in that said extensions (A') are hollow and open in the direction of the side arms (C), each side arm (C) being provided with a connection part (B) having an internal transverse slot (3), and that, for each side arm, an S-shaped spring is situated in the hollow of said extension (A') (1), said spring forming a hook (1', 1") at each end, and the first end (1') being insertable into said slot (3) of connection part (B) while the other end (1") is insertable into said hollow extension (A'), said extension (A') being formed to allow articulation of said arms (C).

2. A frame as claimed in claim 1, characterised in that said other end (1") of the connection spring (1) is "U" shaped with one extermity abuting in a respective inside propping seat (2) of said extension (1').

3. A frame as claimed in claim 1 characterised in that at the end (B) of the arm (C) a tooth is formed (4) to allow the clapping of the end (1') of the flexion spirng (1) and to realize a head end abutment.

4. A frame as claimed in claim 1 characterised in that each said spectacle frame extension (A') has a part of the respective extremity inner surface asported to allow the hooked extremity (B) of the respective arm (C) to rotate in inside direction.

* * * * *

UNITED STATES PATENT AND TRADEMARK OFFICE
CERTIFICATE OF CORRECTION

PATENT NO. : 4,995,713

DATED : February 26, 1991

INVENTOR(S) : Caterino Curto et al

It is certified that error appears in the above-identified patent and that said Letters Patent is hereby corrected as shown below:

Column 1, lines 22-24, "Flexible spectacle arm whose length can be regulated with incorporated hinge and relative frame and spectacles" should be --Flexible Spectacle Arm Whose Length Can Be Regulated with Incorporated Hinge and Relative Frame and Spectacles--

Column 1, line 32, "besides" should be --additionally are--

Column 1, line 33, "even only of" should be --of even only--

Column 1, line 39, "U.S. Pat. No. . . . replacement." should be a separate paragraph Column 1, line 55, "GB-A-317689" should be --U.S. Pat No. 3,531,190--

Col. 2, line 25, "abuting" should be --abutting--

Column 2, line 38, "characteristing" should be --characteristic--

Column 2, line 55, "extermity" should be --extremity--

Column 2, line 56, "(1')" should be --(A')--

Column 2, line 63, "asported" should be --transported--

Column 2, line 65, after "in" insert --the--

Signed and Sealed this

Second Day of March, 1993

*Attest:*

STEPHEN G. KUNIN

*Attesting Officer*   Acting Commissioner of Patents and Trademarks